United States Patent Office 2,897,854
Patented Aug. 4, 1959

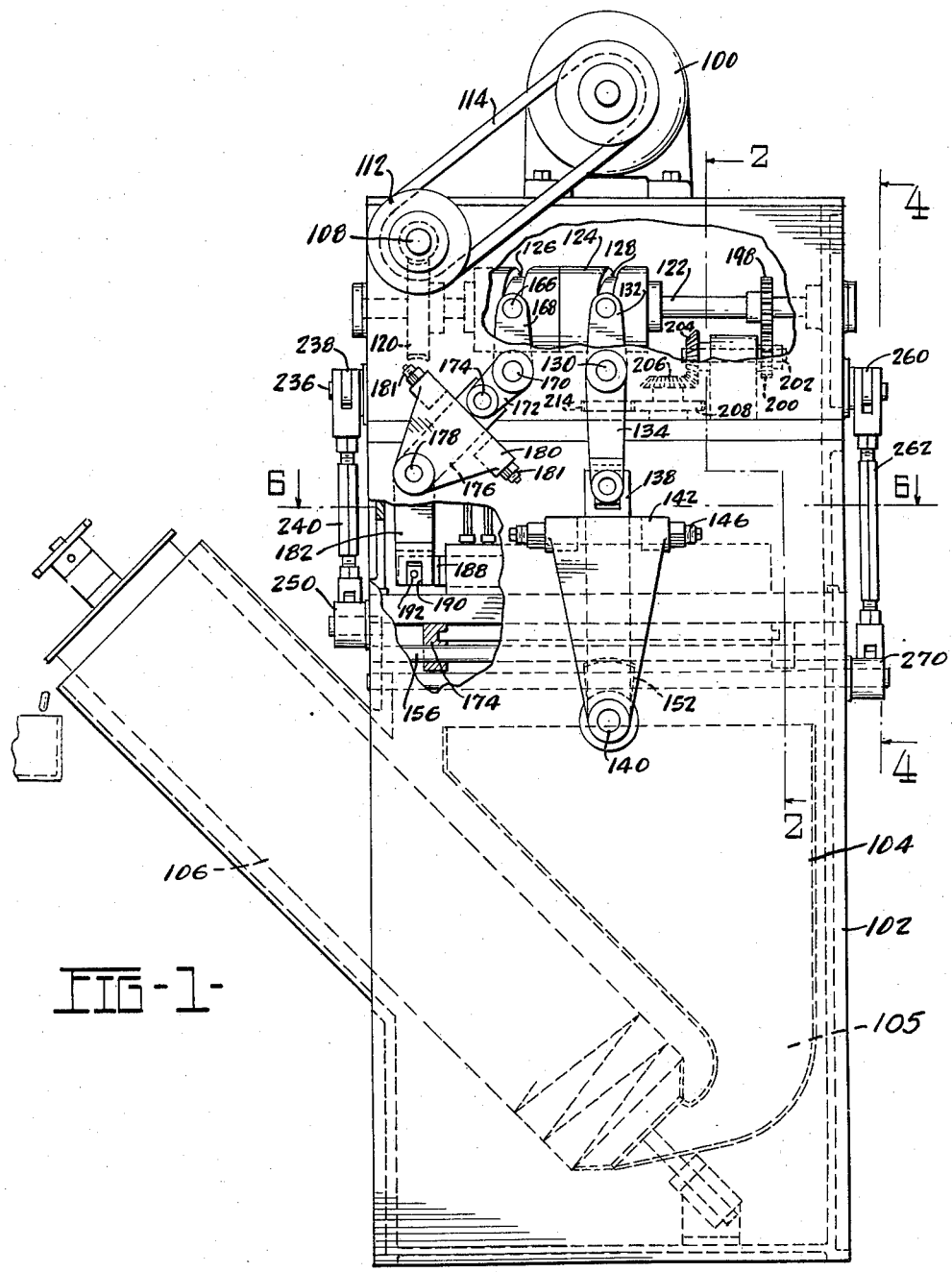
FIG-1-

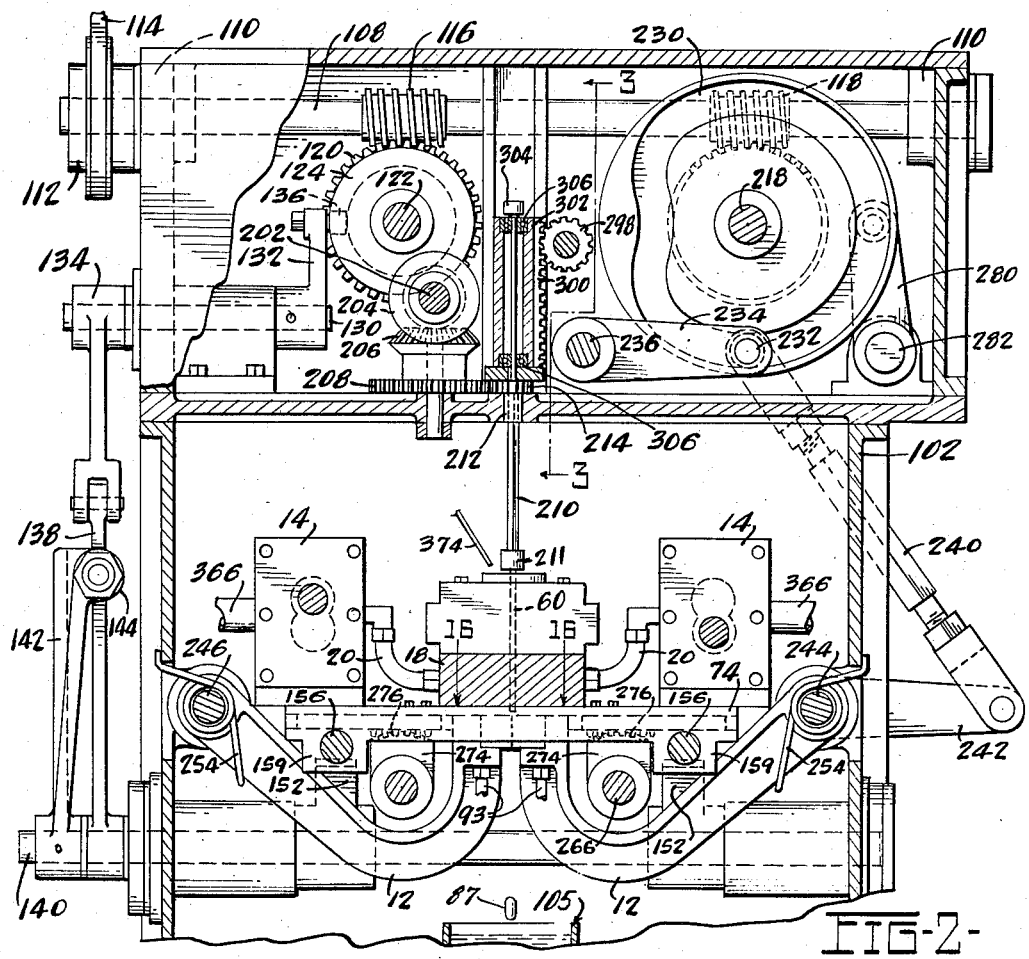
FIG-2-
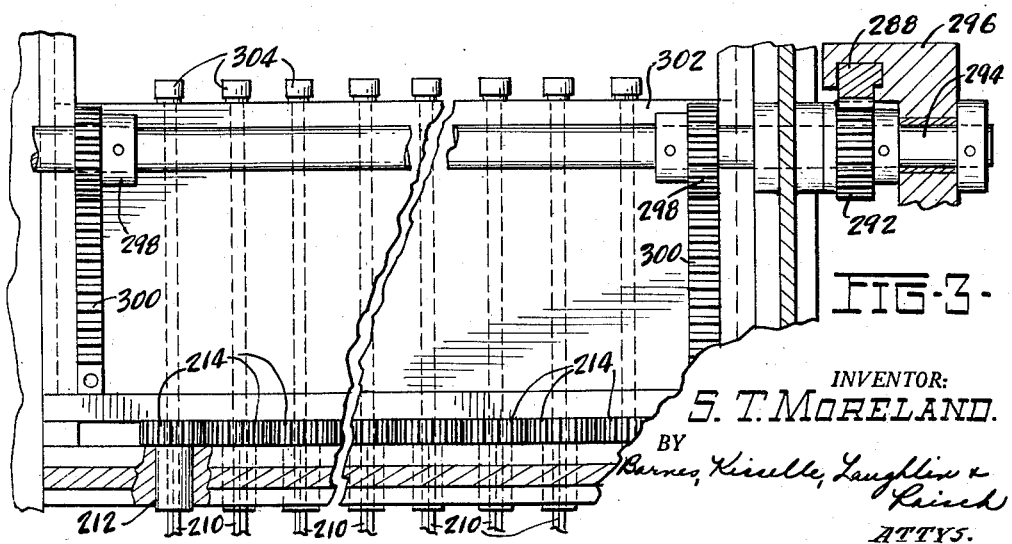
FIG-3-
INVENTOR:
S. T. MORELAND.
BY
Barnes, Kisselle, Laughlin & Raisch
ATTYS.

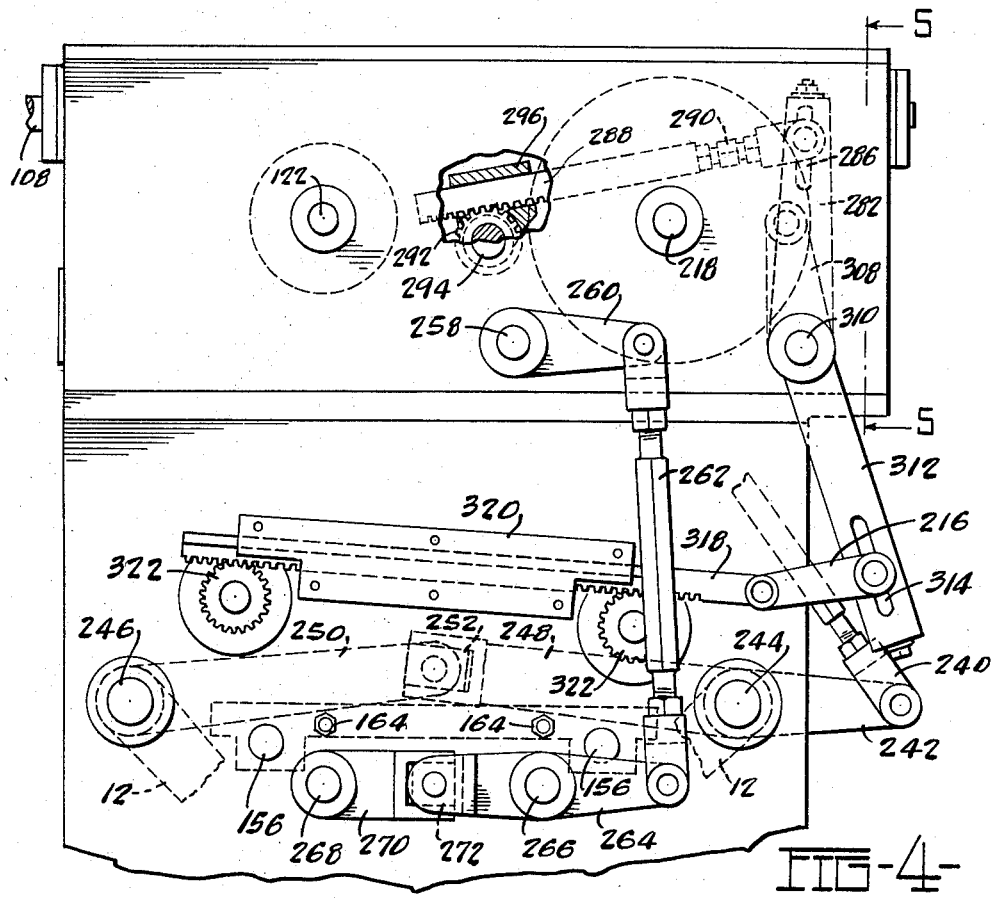
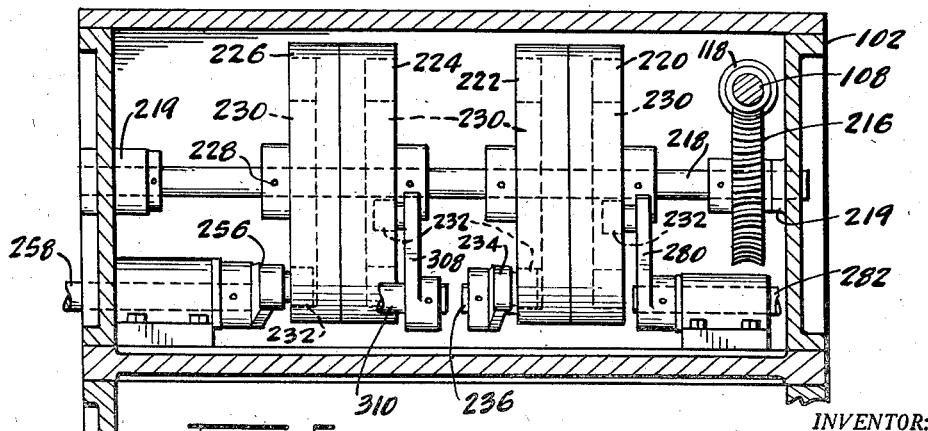

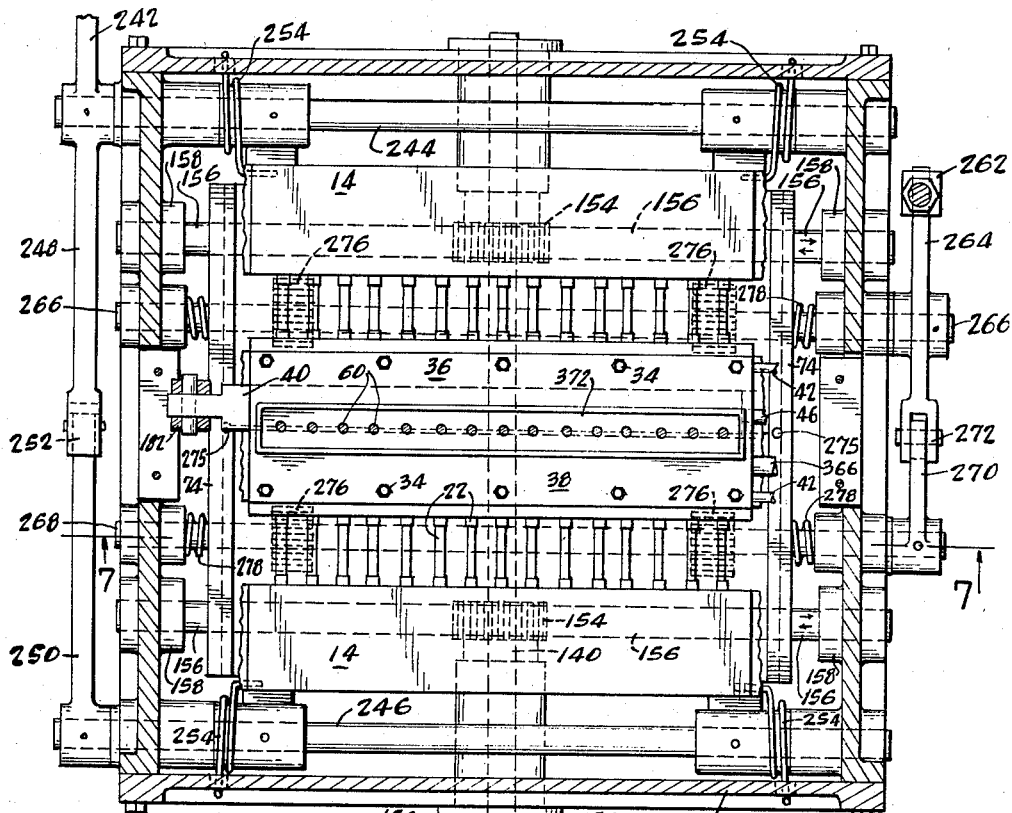
FIG-6-
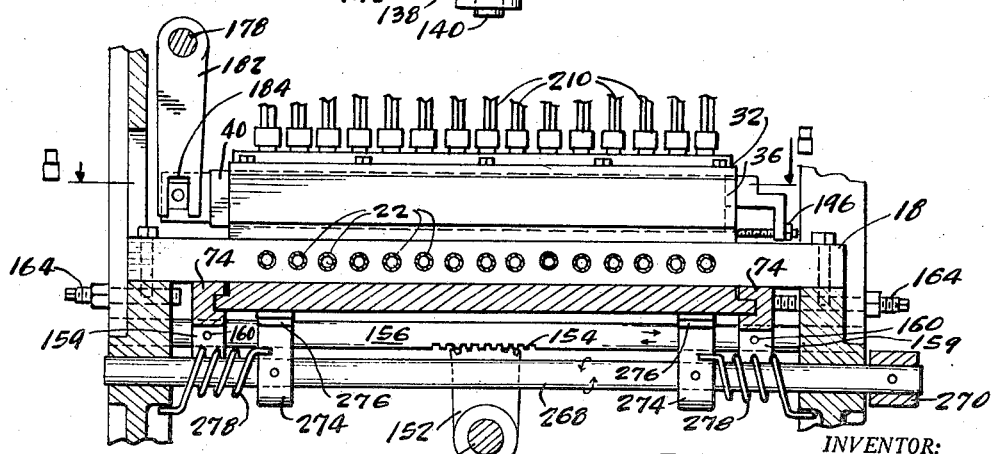
FIG-7-

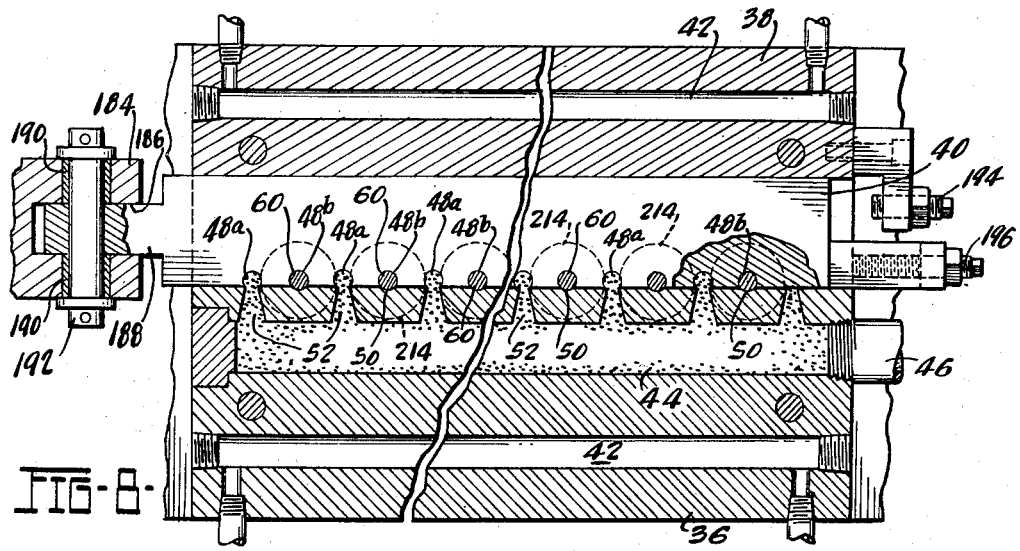
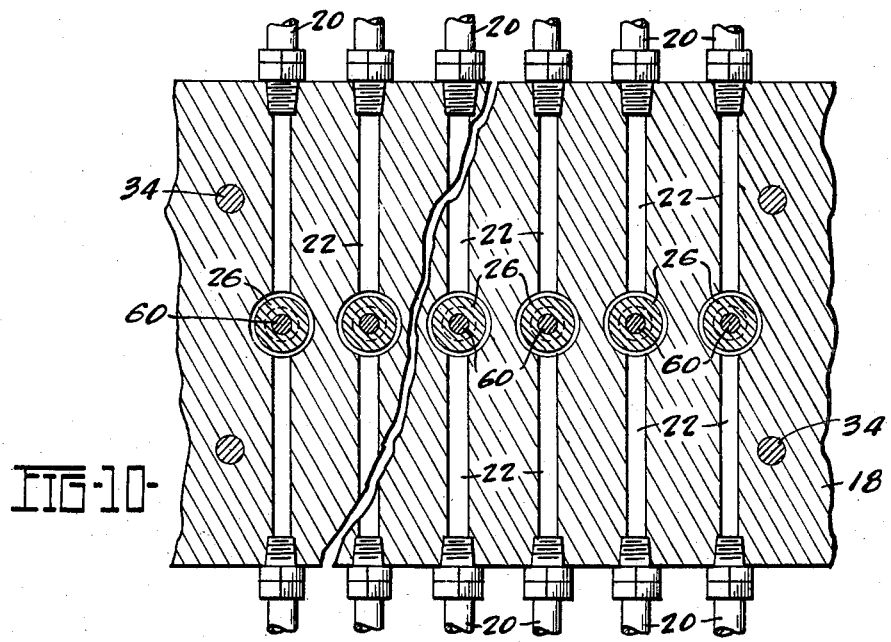
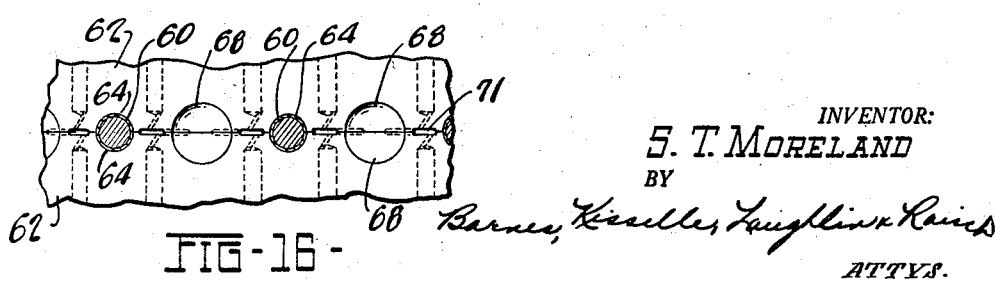

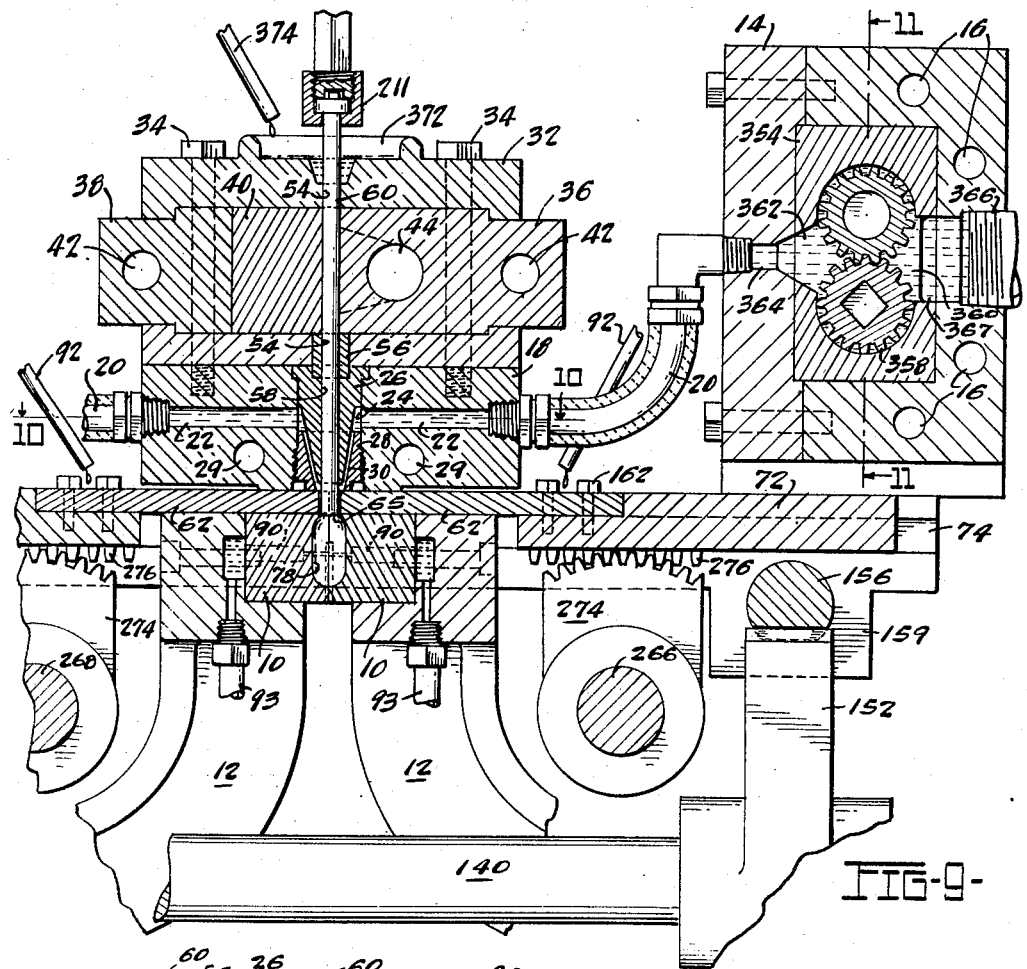
FIG-9-
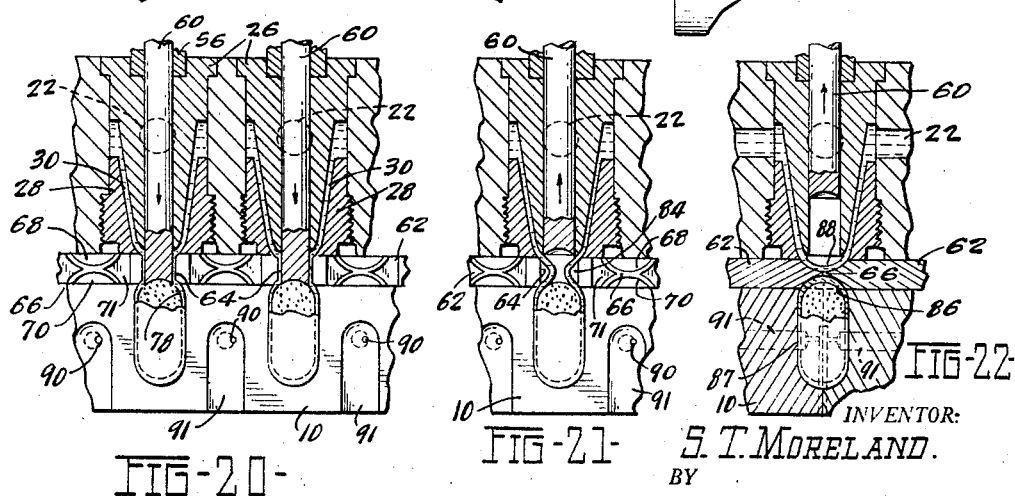
FIG-20- FIG-21- FIG-22-
INVENTOR:
S. T. MORELAND.
BY
Barnes, Kisselle, Laughlin & Raisch
ATTYS.

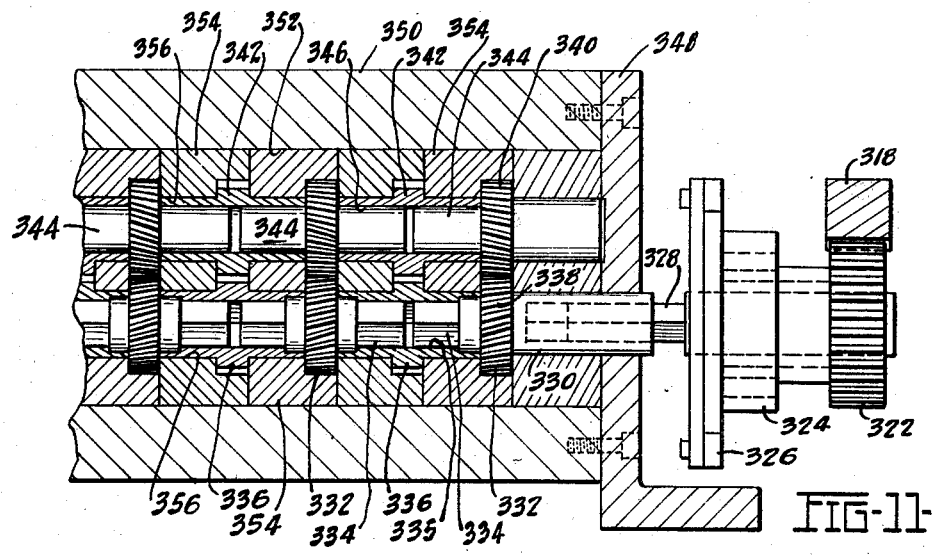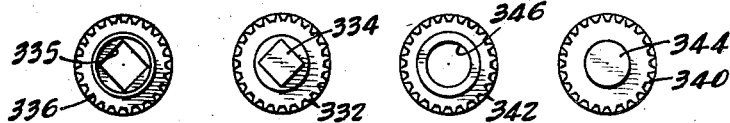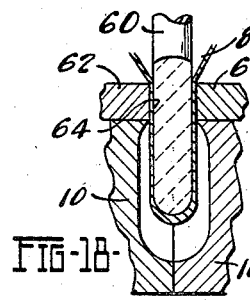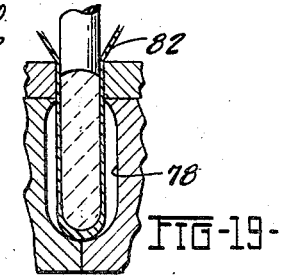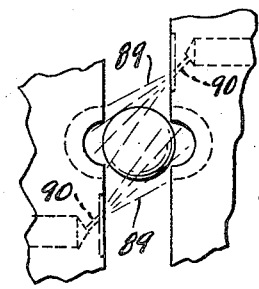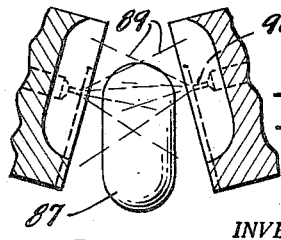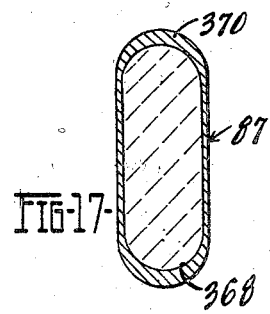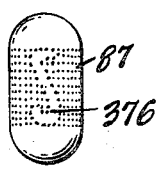

2,897,854

METHOD AND APPARATUS FOR FORMING SEAMLESS CAPSULES

Stephen T. Moreland, Grosse Pointe Park, Mich.

Application October 20, 1954, Serial No. 463,528

5 Claims. (Cl. 141—242)

This invention relates to a method and apparatus for forming capsules of the type wherein a predetermined quantity of fill material is enclosed within a seamless shell formed of a plastic material which is caused to harden into size and shape retaining form.

An object of the invention is to provide an apparatus of this type designed to produce consistently good capsules at a high rate of production.

A further object of the invention is to provide an apparatus of the type described having means for very accurately and adjustably metering the amount of fill material supplied to each capsule.

The invention also contemplates an apparatus wherein the shell material is fed to a mold by means of a gear pump and means are provided for controlling the operation of the gear pump to adjust the rate of feed of shell material and thereby produce a capsule the shell of which is of predetermined thickness which may vary throughout its extent.

It is also an object of this invention to provide capsulating apparatus which includes a gear pump for feeding shell material, the gear pump being designed to produce a continuous smooth stream of shell material.

The invention also contemplates a capsulating appartus designed to accommodate different types of fill material which may vary in viscosity from very fluid liquids to doughy or pasty materials.

The invention also involves a method of capsulating wherein a charge of fill material is first caused to fill a metering cavity of predetermined size, then severed from the supply of fill material and thereafter bodily ejected into a capsule mold while surrounded with a layer of shell material.

Another object of the invention resides in the provision of a method of capsulating wherein a layer of a material inert to both the shell and fill materials is interposed between the shell and the fill to act as a barrier therebetween.

Other objects and advantages of the invention in the way of construction and operation of the apparatus herein disclosed will become apparent from the following description taken in conjunction with the attached drawings in which:

Fig. 1 is a side elevational view with parts broken away of the capsulating machine of this invention.

Fig. 2 is a sectional view of the machine taken along the line 2—2 in Fig. 1.

Fig. 3 is a sectional view taken along the line 3—3 in Fig. 2.

Fig. 4 is a fragmentary elevational view of the machine as viewed along the line 4—4 in Fig. 1.

Fig. 5 is a sectional view taken along the line 5—5 in Fig. 4.

Fig. 6 is a sectional view taken along the line 6—6 in Fig. 1.

Fig. 7 is a sectional view taken along the line 7—7 in Fig. 6.

Fig. 8 is a sectional view taken along the line 8—8 in Fig. 7.

Fig. 9 is a fragmentary sectional view on an enlarged scale showing in greater detail a portion of the arrangement illustrated in Fig. 2.

Fig. 10 is a sectional view along the line 10—10 in Fig. 9.

Fig. 11 is a sectional view along the line 11—11 in Fig. 9.

Figs. 12, 13, 14 and 15 are detailed views showing the four different types of gears employed in the pump illustrated in Fig. 11.

Fig. 16 is a fragmentary sectional view along the line 16—16 in Fig. 2.

Fig. 17 is an enlarged cross sectional view of a finished capsule.

Figs. 18, 19, 20, 21 and 22 show on an enlarged scale the successive operations performed in filling the mold, shaping the capsule and severing the shell from the parent stream of shell material.

Figs. 23 and 24 illustrate the manner in which the finished capsules are ejected from the mold.

Fig. 25 shows a capsule having molded on its surface a desired indicia.

*General description*

Referring to the drawings, and particularly to Fig. 9, the apparatus is of the type where capsules are formed in molds. These molds are formed as a pair of separable half sections 10 mounted on pivoting arms 12. The shell material for the capsules is fed from a suitable source (not shown) by means of two pumps 14. The shell material which, for example, may be gelatin, is pump in a heated fluid condition; and the pumps are therefore provided with passageways 16 through which a heating fluid may be caused to flow. Each pump is connected with a stationary feed block 18 by means of a plurality of insulated conduits 20 which may be heated, if necessary. Block 18 is provided with a plurality of pasageways 22 intersecting central bores 24 at one end and connecting with conduits 20 at their outer ends. Conically shaped guide bushings 26 are press fitted into the upper ends of bores 24, and bushings 28 having a conical recess therein are threaded into the lower portions of bores 24. An annular orifice 30 is provided between the juxtaposed surfaces of bushings 26 and 28 which forms a passageway for shell material. Passageways 29 are provided in block 18 for circulating heating fluid therethrough.

A rectangular housing 32 is mounted on block 18 by means of screws 34. Housing 32 is hollow; and within the housing, there are arranged stationary blocks 36 and 38 and between blocks 36 and 38, there is provided a slidable metering block 40.

Referring now to Fig. 8, it will be seen that stationary blocks 36 and 38 are fashioned with internal passageways 42 for coolant liquid. Block 36 is, in addition, provided with a passageway 44 connected at one end with a fill charging conduit 46 which in turn connects with a supply of fill material under pressure (not shown). Passageway 44 forms a reservoir under pressure for fill material. A plurality of vertically extending cylindrical metering cavities arranged in two groups 48a, 48b are formed through metering block 40. The cavities 48a and 48b are circular in horizontal section with a cord segment removed therefrom. Block 36 is fashioned with recesses 50, one for each set of cavities 48. Recesses 50 are spaced apart twice the distance between successive cavities 48a and 48b. Block 40 is arranged to be shifted between two positions wherein the recesses 50 register with cavities 48a in one position and register with cavities 48b in another position. Between the recesses 50, block 36 is fashioned with a plurality of feed passageways 52 each extending from the reservoir 44 to the inner vertical face of block 36. The arrangement is such that when recesses 50 register with cavities 48a, passageways 52 register with cavities 48b and when recesses 50 register with cavities 48b, passageways 52 register with cavities 48a. In the arrangement illustrated, the apparatus is provided with fifteen molds 10. Thus, block 36 is fashioned with fifteen recesses 50 and sixteen feed passageways 52. Likewise, metering block 40 is fashioned with thirty cavities 48.

Housing 32 is provided with fifteen pairs of vertically aligned bores 54, the lower bore of each pair being provided by a guide and aligning bushing 56. Each of the bushings 56 seats in the upper end of bushings 26, and the latter are provided with bores 58 aligned with the bores 54. Within each set of these aligned bores, there is rotatably and reciprocably arranged a piston 60.

Between the mold sections 10 and the lower face of block 18, there is arranged a pair of opposed blades 62. These blades are illustrated in Fig. 16. The blades 62 are formed at their meeting edges with openings 64 spaced apart to register in one position with pistons 60. Openings 64 cooperate when the blades are in abutting relation to form a guide orifice registering with the inlet 65 of molds 10. Between each pair of openings 64, the opposed edges of blades 62 are fashioned with pinching edges 66 (Fig. 20), the pinching edges being defined by upper and lower concavities 68 and 70 each in the form of a quarter sphere. Between the pinching edges 66 and the openings 64, the edges of blades 62 are relieved as shown at 71. Blades 62 are mounted on rack plates 72 which in turn are arranged for sliding movement in guides 74 so that the two blades can move towards and away from one another. Guides 74 are in turn fixedly supported on rack bars 156 as will be more fully described hereinafter for bodily axial movement in a direction transversely of the ways of guides 74 so as to bring the openings 64 and the concavities 68 and 70 alternately into vertical registration with pistons 60.

The arrangement is such that fill material under pressure is caused to flow from the reservoir 44 through the passageways 52 and into the group of cavities 48 aligned with passageways 52. Thereafter, metering block 40 is shifted axially to bring the one group of filled cavities 48 into alignment with pistons 60 and thus bring the empty cavities 48 into registering relation with passageways 52. Pistons 60 are then driven downwardly to eject or push the charge of fill material in the cavities aligned with piston 60 downwardly into the molds 10 while enveloped by a layer of shell material flowing through the passageways 22 and 30.

The exact manner in which the capsules are formed by this operation is best illustrated in Figs. 18 through 22. During that stage of the operation, when the pistons 60 are moving downwardly, blades 62 are in abutting relation as shown in Fig. 16 with the openings 64 registering with the inlets 65 of each mold cavity 78 and with the bore 58 of bushings 26. At this time, pumps 14 are operating and supplying a stream of shell material to each of the annular orifices 30 between bushings 26 and 28. The shell material is extruded from the lower end of orifice 30 as a closed ended tube as will be presently explained. As pistons 60 move downwardly through the filled cavities 48, the charge of fill material in each cavity is driven downwardly through bushings 26 and into the tube 80 of shell material (Figs. 18 and 19). As the shell material flows through orifice 30 and comes into contact with the refrigerated fill material, it is caused to solidify into a plastic state. When the tube 80 of plastic shell material reaches the lower end of mold cavity 78, the feed of shell material may be discontinued while piston 60 continues to move downwardly to a position wherein the concave lower end 82 thereof forms a shape conforming cap at the inlets 65 of the mold. The tube 80 is expanded by the pressure of the fill charge 83 into the shape of the mold cavity 78. Since cavities 48 can be very accurately machined to size, they can be filled with an accurately metered amount of fill material to exactly fill cavities 78.

When pistons 60 reach their lowermost position illustrated in Fig. 20, they are arranged to reverse their direction of travel thereby drawing a slight vacuum and forming a necked-in portion 84 in the tube of shell material (Fig. 21). A small quantity of shell material may be fed at this moment. Thereafter, blades 62 are caused to move apart and shift laterally to a position wherein the pinching edges 66 are in alignment with the mold cavities 78. Blades 62 are then caused to move towards each other into abutting relation, the pinching edges 66 severing the tube of shell material and the concavities 70 and 68 cooperating to seal and shape the upper end of the capsule being formed as at 86 and likewise seal the lower end 88 of the tube of shell material being extruded (Fig. 22).

Thereafter, the mold sections 10 open and the ejection of the finished capsules 87 in each mold is aided by jets 89 of cooling liquid which are directed through passageways 90 and recesses 91 in mold sections 10 which are arranged to impinge in a generally tangential direction against each half of the mold cavities (Figs. 23 and 24). The finished capsules drop into a chute 105 within coolant tank 104 containing a coolant, which in the case of gelatin capsules, may be mineral oil. The jets 89 of cooling liquid which are pumped under pressure into the molds through conduits 93 and which flow through passageways 90 also lubricate the surfaces of the mold cavity after the capsule is ejected. In this connection, lubricating fluid which may be mineral oil from the tank 104 may also be directed to the top surface of blades 62 through conduits 92 (Fig. 9). This oil lubricates the bearing surfaces of blades 62 and concavities 68 and 70. This oil is also permitted to flow downwardly through the relieved portions 71 at the edges of blades 62. The oil thus provides lubrication to prevent wear and also coats the surfaces with which the gelatin comes in contact to prevent the gelatin from adhering thereto. In this connection, the relieved portions 71 also perform another function; namely, they insure sharp cut off at the pinching edges 66 and at the same time provide means for the excess gelatin pinched between the edges of the blade to escape.

Any suitable means may be employed for actuating the various units of the apparatus in timed relation to perform the operation described above. By the way of illustrating one manner of actuating these various devices, I have shown a motor 100 mounted on the casing 102 of the machine. Within the upper portion of casing 102, the mechanisms for producing the various operations described are enclosed; and at the lower portion of casing 102, there is arranged below molds 10 a coolant reservoir 104 which in the case of gelatin capsules, may contain mineral oil. This reservoir is preferably refrigerated by conventional coolant coils, not illustrated. The reservoir contains a generally funnel-shaped chute 105 formed of wire mesh and extending upwardly from the lower end thereof is a conveyor mechanism 106 which may be conveniently formed as a screw conveyor. Conveyor 106 discharges the finished capsules from chute 105 onto suitable drying apparatus (not shown).

The main driving shaft 108 of the apparatus is journalled in bearings 110 and is provided at one end thereof with a pulley 112 having a belt drive 114 with motor 100. Shaft 108 has fixed thereon a pair of worm gears 116 and 118. Worm 116 meshes with a worm wheel 120 at one end of a shaft 122 on which is fixed a cylinder 124 fashioned with cam grooves 126 and 128 (Fig. 1).

Blade shifting mechanism

A shaft 130 has an arm 132 fixed at the inner end thereof and an arm 134 mounted on the outer end thereof exteriorly of housing 102 (Figs. 1 and 2). The free end of arm 132 carries a roller 136 which rides in cam track 128. At its free end, lever 134 is pivotally and slidably connected with the upper end of lever 138 which is supported for free rotation on a shaft 140. A bracket 142 is fixed to one end of shaft 140. Bracket 142 is fashioned with laterally extending lugs 144 into which are threaded opposed, adjusting screws 146. A compression spring 150 (Fig. 6) is arranged between the end of each screw 146 and the adjacent side face of lever 138. Thus, there is provided between lever 138 and bracket 142 a yielding driving connection.

Within housing 102, there is fixedly mounted on shaft 140 a pair of segmental gears 152 (Fig. 7). The segmental gears 152 mesh with gear rack portions 154 formed on bars 156 which are arranged for axial sliding movement in the bearings 158 formed in the side walls of housing 102 (Fig. 6). Guides 74 are provided with bosses 159 on the lower side thereof which are fixed on bars 156 as by pins 160. Thus, as lever 132 oscillates back and forth in following cam track 128, rack plates 72 on which the blades 62 are mounted as by screws 162 are caused to oscillate back and forth to positions wherein openings 64 and the pinching edges 66 are alternately and successively aligned with the inlets 65 of mold cavities 78. Adjusting stop screws 164 (Fig. 7) are provided for limiting the movement of rack plate 72 in opposite directions to accurately determined positions. In this connection, it will be appreciated that springs 150 provide a lost motion connection between lever 138 and bracket 142 which permits adjustment of the travel of rack plates 72.

Metering block reciprocating mechanism

Within cam track 126 of cylinder 124 (Fig. 1), there is arranged a cam follower 166 which is mounted at the free end of an arm 168 fixed on a shaft 170 within housing 102. To the outer end of shaft 170 is fixed a lever 172 having a pivoting and sliding connection at 174 with a driving lever 176 mounted to rotate freely on shaft 178. A bracket 180 provided with adjusting screws 181 is fixed on one end of shaft 178 and is pivoted back and forth by lever 176 in the same manner that bracket 142 is yieldably pivoted by lever 138. Bracket 180 oscillates an arm 182 depending from shaft 178; and at its free end, arm 182 is bifurcated as at 184. At the bifurcation 184, arm 182 is also slotted in a direction transverse to the bifurcation 184 as indicated at 186 in Fig. 8. A lug 188 at one end of metering block 40 extends through the slot 186, and this lug is connected for pivotal and sliding movement with the lower end of arm 182 by a pair of small slide blocks 190 and a pivot pin 192. Thus, as cam follower 166 rides in cam track 126, bracket 180 rocks lever 182 and thus shifts metering block 40 to its two positions, that is, to a position wherein the cavities 48a register with feed passageways 52 and to the other position wherein these cavities 48a register with the recesses 50 in block 36. Accurate alignment of the metering block 40 in these positions is obtained by adjusting stop screws 194 and 196.

Plunger rotating mechanism

Referring now to Figs. 1 and 2, shaft 122 on which the cam cylinder 124 is mounted also supports a spur gear 198 which meshes with a second spur gear 200 on one end of a stub shaft 202 having a bevel gear 204 fixed at the other end thereof. Bevel gear 204 engages with a bevel pinion 206 which drives spur gear 208. Each of the pistons 60 has a driving connection with a drive shaft 210 and is connected thereto by a coupling 211. Shaft 210 has a square shank portion which is received in a bushing 212 on which a spur gear 214 is fixed. The spur gears 214 of adjacent pistons intermesh one with another (Fig. 3), and gear 208 meshes with one of the gears 214 to drive the whole train of gears 214 and thus rotate pistons 60. Thus, as long as the machine is in operation, pistons 60 are caused to rotate continuously. This prevents "capping" or sticking of the fill material to the lower concave ends 82 of the plungers.

Mold operating mechanism

Referring now to Figs. 2, 4 and 5, it will be observed that worm 118 on shaft 108 drives a worm wheel 216 fixed on shaft 218 which is supported at opposite ends by bearings 219 in the side walls of housing 102. A series of four cam plates 220, 222, 224 and 226 are adjustably fixed on shaft 218 as by set screws 228. Each cam plate is fashioned on the side face thereof with a cam track 230 in which is arranged a follower 232. The follower 232 on cam plate 222 is mounted at the free end of an arm 234 carried by one end of a shaft 236. The other end of shaft 236 projects through the side wall of housing 102 and supports a lever 238 (Fig. 1) to the free end of which is pivotally connected a turnbuckle 240 which in turn pivotally connects with a lever 242 fixed on a shaft 244 (Fig. 2). A second shaft 246 (Figs. 2 and 4) is mounted on housing 102 parallel to shaft 244 and symmetrical with respect to the pistons 60. Levers 248 and 250 (Figs. 4 and 6) are fixed on shafts 244 and 246 respectively, and these levers are interconnected at their free ends for pivotal movement in unison by a sliding block arrangement 252. The sliding block arrangement 252 is similar in construction to the pivotal and sliding connection between the lug 188 on metering block 40 and the lever 182. The arcuately shaped mold support arms 12 are also fixed one on shaft 244 and the other on shaft 246. Coil springs 254 bias arms 12 upwardly in the mold closing direction. In the arrangement described, it is apparent that as the cam follower 232 rides through track 230, lever 242 is caused to oscillate to an extent determined by the shape of the cam track 230 and thereby cause the arms 12 to pivot downwardly in the mold opening direction and then upwardly in the mold closing direction. The sliding block arrangement 252 in conjunction with the arms 248 and 250 merely insures the opening and closing of the two mold halves 10 in unison. The extent of opening and closing of the molds can, of course, be adjusted by adjusting the turnbuckle 240.

Knife blade openings and closing mechanism

The mechanism for opening and closing the knife blades is best illustrated in Figs. 2, 4, 5, 7 and 9. Cam plate 226 (Fig. 5) controls the opening and closing of knife blades 62. The follower 232 in the cam track of plate 226 is mounted at the free end of an arm 256 fixedly supported at the inner end of a shaft 258. At the outer end of shaft 258, there is mounted an arm 260, the free end of which is pivotally connected by a turnbuckle 262 with one end of a lever 264 which is pivotally supported intermediate its ends on a shaft 266 (Fig. 4). A second shaft 268 extends parallel to shaft 266 and symmetrically with respect to pistons 60. An arm 270 on shaft 266 is connected at its free end with the free end of lever 264 by means of a sliding block arrangement 272 which is similar in construction and purpose to the slide block arrangement 252. Segmental gears 274 are mounted on shafts 266 and 268, and these gears are arranged to interengage with the gear rack portion 276 on the underside of rack bars 72 which support blades 62 (Fig. 9). Coil springs 278 engage segmental gears 274 and urge the blades in a direction towards one another to the closed position. Thus, as follower 232 rides in the track of cam plate 226, lever 260 (Fig. 4) is oscillated and in turn oscillates through turnbuckle 262 and lever 264. This produces rotation of shafts 266 and 268 which through the segmental gears 274 cause the blades 62 to open and close in unison. The extent to which the blades open can be adjusted by means of turnbuckle 262, and the duration of the interval during which the blades are opened or closed is controlled by the shape of the cam track 230 in cam plate 226. Pins 275 (Fig. 6) are mounted on guides 74 in line with pistons 60. Pins 274 form stops against which the ends of blades 62 abut to accurately position the blades in the closed position.

*Piston reciprocated mechanism*

The arrangement utilized for reciprocating pistons 60 is best illustrated in Figs. 2, 3, 4 and 5. This operation is controlled by the follower 232 in the cam track of plate 220. Follower 232 is supported at the free end of an arm 280 fixedly mounted at one end of a shaft 282. At the opposite end of shaft 282 is fixedly mounted a lever 284, the free end of which is slotted as at 286 (Fig. 4). A gear rack 288 is adjustably connected with lever 284 in slot 286 by means of a turnbuckle 290. Gear rack 288 meshes with a pinion 292 keyed to a shaft 294. Rack 288 is held in engagement with pinion 292 by a guide 296 supported freely on shaft 294. Also mounted on shaft 294 are a pair of pinions 298 which engage with vertically extending rack bars 300 fixed on a hollow frame 302 (Figs. 2 and 3). The upper ends of the drive shafts having the square section 210 are provided with circular shank portions 304. The shank portions 304 of the drive shafts extend upwardly through frame 302 and are rotatably supported therein as by bearings 306. The construction is such that as frame 302 is raised and lowered by the engagement of pinions 298 with racks 300, the pistons 60 are likewise reciprocated vertically. Between the uppermost and lowermost positions, the vertical stroke of the plunger can be adjusted as desired by means of the turnbuckle 290 in conjunction with the sliding connection between turnbuckle 290 and lever 284 and slot 286.

*Pump operating mechanism*

Two pumps 14 are illustrated, but one pump may be sufficient depending on the shell material used and the type of capsule to be formed. The operation of pumps 14 is controlled by the follower 232 in cam plate 224. This cam follower is mounted at the free end of an arm 308 fixed at one end of a shaft 310. To the other end of shaft 310 is fixed a lever 312 provided with a slot 314 adjacent its free end (Fig. 4). A short connecting link 316 is pivotally connected with lever 312 at one end in slot 314; and at its other end, lever 316 pivotally connects with a gear rack 318. A guide 320 maintains gear rack 318 in meshing relation with pinions 322, one on each of the gear pumps 14 (Fig. 4). The gear pumps 14 are generally of like construction with the exception, however, that they are driven in opposite directions as viewed in Figs. 2 and 4. The description of one gear pump will therefore suffice.

Referring to Fig. 11, pinion 322 is connected through a one-way clutch 324 and a pre-loaded friction disc brake 326 with the gears within the pump. The driven shaft 328 has a splined connection with the hub 330 at one side of a drive gear 332. Drive gear 332 has a splined or a square hub 334 received within the correspondingly shaped bore 335 of an adjacent drive gear 336. The gears 332 and 336 are thus alternately arranged in axial succession along the pump, the square end 334 of gears 332 driving the next adjacent gear 336 and the square bore 335 of the gears 336 driving the next adjacent gears 332 through the squared ends 334. All of these gears are fashioned with helically shaped teeth 338 as shown in Fig. 11. Each of the gears 332 meshes with an idler gear 340 and each of the gears 336 meshes with an idler gear 342. Gears 340 are fashioned with stub axles 344 which are round in cross section, and the gears 342 are fashioned with round bores 346 which receive the stub axles 344. The bores 346 thereby provide relatively long bearings for the stub axles of gears 340.

The housing of the pump comprises end plates 348 and a hollow body portion 350 to which the end plates are bolted. Within the generally rectangular bore 352 of body 350 are positioned a plurality of similarly shaped inserts 354 each of which is fashioned with bores 356 for receiving the round hubs of gears 336 and 342 and recesses 358 to accommodate the gears. At one side thereof, the inserts 354 are formed with an inlet 360; and at the opposite side of the gears, the inserts 354 are provided with recesses 362 forming outlet chambers of the pump which communicate with the outlet passageways 364 to which the conduits 20 are connected (Fig. 9). The shell material is admitted to the pump through an inlet 366 and a header passageway 367 connecting all the pump chambers 360 with inlets 366. Thus, as cam follower 232 rides through the track of cam plate 224, gear rack 318 is reciprocated; and clutch 324 provides a one-way driving connection between pinion 322 and the gears within the pump. On the power stroke of the rack 318, the pumps are operated. The stroke of gear rack 318 may be adjusted by shifting the pivotal connection between levers 316 and 312 in slot 314. At the same time, the cam track 230 in cam plate 224 may be so shaped to vary the rate of travel of gear rack 318 on the power stroke and thereby feed a greater or lesser controlled amount of shell material to selected portions of the capsule. In the arrangement illustrated, the cam track of plate 224 is designed to accelerate operation of the gear pumps adjacent the start and the end of the power stroke. Thus, at the lower and the upper ends of each capsule, the shell is thicker as indicated at 368 and 370 in Fig. 17. This insures positive sealing of the opposite ends of the capsules.

Referring now to Fig. 9, it will be noted that the upper face of block 32 is fashioned with a reservoir 372 surrounding the bores 54 in which the pistons 60 reciprocate. In operation, this reservoir may be supplied with a barrier oil as from a conduit 374. The barrier oil in reservoir 372 is carried down by the rotating and reciprocating piston 60, thus coating the cavity walls of the metering block 40 and the recesses 50 of block 36. The charge of fill material in each of the cavities 48 is thus coated with a thin layer of barrier oil before the charge is ejected into the extruding shell. The barrier oil comprises an inert liquid which does not react with the fill material or shell material. Certain types of silicones, for example, provide a barrier between the fill material and water in the gelatin mass in the case of gelatin shells, thus preventing or retarding the water from travelling from the shell into the fill mass. This feature is highly advantageous with many types of capsules because many ingredients which go into the make up of the fill mass react with water and in so doing, lose their potency.

Although the apparatus and method described herein has been illustrated primarily in connection with capsules formed with gelatin shells, the invention is obviously not limited to the use of gelatin as the shell material. Fill materials in the form of aqueous solutions such as hair shampoos, tooth pastes, soup concentrates, etc. cannot be capsulated in gelatin; and in such cases, the shell material may be in the form of a water insoluble plastic material having a low melting temperature, polyethylene, for example. The shell material may be of a thermoplastic nature or of a thermosetting nature and the mold will be accordingly heated or cooled. In either event, the mold cavity may be formed, if desired, with suitable indicia on its surface to produce a brand mark 376 on the finished capsule as is indicated in Fig. 25.

Thus, it will be seen that I have provided an apparatus and method for forming seamless capsules which are not only novel, but which insure a high rate of production of capsules of consistently good quality. The provision of the accurately machined cavities 48 in the metering block 40 enables precise control of the amount of fill material incorporated in each cavity. To change the machine from a capsule of one size to a capsule of another size, it is merely necessary to substitute suitable molds 10 and another block assembly of members 32, 36 and 40 together with a set of pistons of proper diameter. At the same time, the operation of the pumps 14 is adjusted to produce the desired rate of flow of shell material; and the stroke of pistons 60 is likewise adjusted in accordance with the size of capsule being formed.

It will be appreciated that the manner in which the molds are charged with fill material, that is, by filling the metering cavities and thereafter bodily moving the charge in the metering cavities into the molds, adapts the apparatus for capsulating different materials which vary considerably in their viscosity. The adjustments provided for the various mechanisms described above provide means for accurately controlling the timing and duration of each successive operation. At the same time, I have found that by the use of helical gears on the shell material pumps, a smooth continuous flow of shell material is assured.

I claim:

1. In a capsulating apparatus, a housing having a generally cylindrical metering cavity therein for receiving capsulating material, said metering cavity having a discharge opening at one axial end thereof, a mold provided with a cavity the mouth of which is aligned with said discharge opening to receive capsulating material from said cavity, said mold cavity and said metering cavity having substantially the same volume, a piston movable in said metering cavity from the opposite axial end thereof, means for filling said metering cavity with capsulating material and means for moving said piston axially towards the discharge opening in said metering cavity to a position closing the mouth of said mold cavity to discharge the capsulating material into and completely fill the cavity of said mold, and means for rotating said piston about its axis.

2. In a capsulating apparatus, a housing having a passageway therein, a block reciprocable axially in said passageway and having a cross section corresponding to the cross section of said passageway, said block having at least two generally cylindrical metering cavities therein, the axes of said metering cavities extending generally transversely of the axis of reciprocation of said block, said housing having a fill material passageway therein intersecting said first mentioned passageway, means for reciprocating said block to a first position wherein one of said metering cavities is opened to said fill material passageway and the other is closed thereto and to a second position wherein the other cavity is opened to said fill material passageway and the first is closed thereto, said housing having a pair of openings therein adapted to register with opposite ends of one of said metering cavities in said first position of the block and with the opposite ends of the other of said metering cavities in said second position of the block, one of said openings forming a discharge port and a piston movable axially through the other of said openings and the cavity registering therewith to discharge fill material from said metering cavity through said discharge port, and means for simultaneously rotating said piston and moving it axially.

3. In a capsulating apparatus, a housing, a block slidably arranged in said housing, said block having a pair of generally cylindrical metering cavities therein, said housing having a pair of openings therein, said block being movable in opposite directions in said housing to a first position wherein the opposite axial ends of one of said cavities are aligned with said openings and to a second position wherein the opposite axial ends of the other cavity are aligned with said openings, a piston movable through at least one of said openings and the cavity aligned therewith, means for limiting the movement of said block in opposite directions to said two positions, a power unit including a driving member movable in opposite directions, means forming a yieldable driving connection between said driving member and said block to permit overtravel of the driving member when the block is engaged by said means for limiting movement thereof in opposite directions, said driving connection including a bracket movable in opposite directions and connected with said block to reciprocate the block, said bracket having opposed spaced apart abutments disposed in the path of movement of said driving member and a pair of opposed springs arranged one between said driving member and each of said opposed spaced apart lugs of said bracket.

4. In a capsulating apparatus, a housing having a passageway therein, a block reciprocable axially in said passageway and having a cross section corresponding generally to the cross section of said passageway, said block having a series of generally cylindrical metering cavities therein, the axes of said metering cavities extending generally transversely of the axis of reciprocation of said block, said housing having a fill material passageway therein intersecting said first mentioned passageway, means for reciprocating said block to a first position wherein a first group comprising every other cavity is opened to said fill material passageway and a second group comprising the cavities in between the cavities of the first group are closed to said fill material passageway and to a second position wherein the cavities of the second group are opened to said fill material passageway and the cavities of the first group are closed thereto, said cavities all being arranged in a row equally spaced apart, said housing having a plurality of pairs of openings therein adapted to register with the opposite ends of said metering cavities, said pairs of openings in said housing being spaced apart a distance corresponding to the spacing between successive metering cavities in one group so that in one position of said block, the openings in said housing register with the opposite ends of the metering cavities in one group and in the other position of said block, the openings in said housing register with the opposite ends of the metering cavities in the other group, one opening in each pair forming a discharge port and a plurality of pistons movable axially through the other of said openings and the metering cavity registering therewith to discharge fill material from said metering cavities through said discharge ports, a mold member having a plurality of cavities therein, said mold cavities being aligned one with each of said discharge ports, said pistons being arranged to bodily move a charge of fill material from said metering cavities into said mold cavities, said metering cavities and said mold cavities being of substantially the same volume, said mold cavities each having a mouth portion positioned adjacent said discharge ports, said pistons being movable axially to a position wherein the leading end thereof closes the mouth portion of each mold cavity, and means for continuously rotating said pistons about their longitudinal axes.

5. In a capsulating apparatus, a housing having a generally cylindrical metering cavity therein for receiving capsulating material, said metering cavity having a discharge opening adjacent one end thereof, a mold provided with a cavity, the mouth of which communicates with said discharge opening to receive capsulating material from said cavity, a piston movable axially in said metering cavity, means for filling the metering cavity with capsulating material, means for moving the piston axially towards the discharge opening in said metering cavity to discharge capsulating material into the cavity of said mold and means for rotating said piston about its longitudinal axis while the piston is moved axially toward the discharge opening.

References Cited in the file of this patent

UNITED STATES PATENTS 332,204    Krehbiel _____ Dec. 8, 1885

(Other references on following page)

UNITED STATES PATENTS

| Number | Name | Date |
|---|---|---|
| 339,547 | Hammelmann | Apr. 6, 1886 |
| 584,241 | Richardson | June 8, 1897 |
| 620,007 | Wood | Feb. 21, 1899 |
| 796,724 | Hewitt | Aug. 8, 1905 |
| 936,722 | Howard | Oct. 12, 1909 |
| 1,147,512 | Kirkland | July 20, 1915 |
| 1,178,456 | Pocock | Apr. 4, 1916 |
| 1,289,752 | Hawkins | Dec. 31, 1918 |
| 1,318,292 | Laskey | Oct. 7, 1919 |
| 1,327,806 | Bunde | Jan. 13, 1920 |
| 2,205,837 | Ravenscroft et al. | June 25, 1940 |
| 2,266,241 | O'Brien | Dec. 16, 1941 |
| 2,275,654 | Ravenscroft et al. | Mar. 10, 1942 |
| 2,286,031 | Bowering | June 9, 1942 |
| 2,287,318 | McIntyre | June 23, 1942 |
| 2,322,169 | Smith | June 15, 1943 |
| 2,339,286 | Moule | Jan. 18, 1944 |
| 2,396,406 | Anderson | Mar. 12, 1946 |
| 2,436,439 | Lincoln et al. | Feb. 23, 1948 |
| 2,449,139 | Posner | Sept. 14, 1948 |
| 2,452,607 | Slaughter | Nov. 2, 1948 |
| 2,457,687 | Kopitke | Dec. 28, 1948 |
| 2,508,204 | Weber et al. | May 16, 1950 |
| 2,513,581 | Moule | July 4, 1950 |
| 2,549,327 | Moule | Apr. 17, 1951 |
| 2,572,984 | Byers | Oct. 30, 1951 |
| 2,599,493 | Slaughter | June 3, 1952 |
| 2,626,738 | Nordquist | Jan. 27, 1953 |
| 2,627,765 | Hopkins | Feb. 10, 1953 |
| 2,665,638 | Lauck | Jan. 12, 1954 |
| 2,671,245 | Kath | Mar. 9, 1954 |
| 2,675,584 | Fienberg et al. | Apr. 20, 1954 |
| 2,687,553 | Colombo | Aug. 31, 1954 |